United States Patent
Englert et al.

(10) Patent No.: US 10,377,364 B2
(45) Date of Patent: Aug. 13, 2019

(54) METHOD FOR PERFORMING A FUNCTION CHECK ON AN ELECTROMECHANICAL BRAKE DEVICE

(71) Applicant: Robert Bosch GmbH, Stuttgart (DE)

(72) Inventors: Andreas Englert, Untergruppenbach (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 15/665,964

(22) Filed: Aug. 1, 2017

(65) Prior Publication Data

US 2018/0037208 A1 Feb. 8, 2018

(30) Foreign Application Priority Data

Aug. 2, 2016 (DE) .................. 10 2016 214 195

(51) Int. Cl.
 *B60T 17/22* (2006.01)
 *B60T 13/74* (2006.01)
 *B60T 8/171* (2006.01)
 *B60T 8/88* (2006.01)

(52) U.S. Cl.
 CPC ............ *B60T 17/221* (2013.01); *B60T 8/171* (2013.01); *B60T 8/885* (2013.01); *B60T 13/741* (2013.01); *B60T 13/746* (2013.01); *B60T 2270/406* (2013.01)

(58) Field of Classification Search
 CPC ........ B60T 8/171; B60T 13/741; B60T 8/885; B60T 17/221; B60T 13/746; B60T 2270/406
 See application file for complete search history.

(56) References Cited

U.S. PATENT DOCUMENTS

| | | | | |
|---|---|---|---|---|
| 4,671,576 A | * | 6/1987 | Fourie | B60T 8/1705 188/156 |
| 4,797,831 A | * | 1/1989 | Dressing | B30B 15/20 700/165 |
| 4,904,027 A | * | 2/1990 | Skantar | B60T 13/58 303/15 |
| 5,088,042 A | * | 2/1992 | Brearley | B60T 8/1766 188/349 |
| 5,089,960 A | * | 2/1992 | Sweeney, Jr. | A63B 24/0087 463/6 |
| 5,404,303 A | * | 4/1995 | Pattantyus | B60T 8/17616 701/78 |
| 6,012,781 A | * | 1/2000 | Gerum | B60T 7/20 303/22.4 |
| 2010/0243388 A1 | * | 9/2010 | Holzwarth | B60T 8/885 188/158 |

(Continued)

FOREIGN PATENT DOCUMENTS

| | | |
|---|---|---|
| DE | 195 48 560 A1 | 6/1997 |
| DE | 103 61 042 B3 | 5/2005 |

*Primary Examiner* — Mussa A Shaawat
(74) *Attorney, Agent, or Firm* — Maginot, Moore & Beck LLP

(57) ABSTRACT

In the case of a method for performing a function check on an electromechanical brake device having at least one electric brake motor, the motor current is measured at the brake motor and compared with a calculated motor current, wherein an error signal is generated in the event of an inadmissibly high deviation.

14 Claims, 5 Drawing Sheets

(56) References Cited

U.S. PATENT DOCUMENTS

2015/0191159 A1* 7/2015 Akamine .............. B60T 8/1755
                                                                 701/22
2016/0375887 A1* 12/2016 Baehrle-Miller ......... B60T 7/12
                                                                  303/15

* cited by examiner

METHOD FOR PERFORMING A FUNCTION CHECK ON AN ELECTROMECHANICAL BRAKE DEVICE

This application claims priority under 35 U.S.C. § 119 to application no. DE 10 2016 214 195.3, filed on Aug. 2, 2016 in Germany, the disclosure of which is incorporated herein by reference in its entirety.

BACKGROUND

The disclosure relates to a method for performing a function check on an electromechanical brake device having at least one electric brake motor.

DE 103 61 042 B3 discloses a holding brake in a vehicle and said holding brake can be used to generate a clamping force that holds the vehicle in the stationary state. The holding brake comprises an electric brake motor that influences a brake piston, which is a carrier of a brake lining, in the axial direction towards a brake disc.

DE 195 48 560 A1 discloses a braking system in a vehicle, said braking system having electric brake motors on the wheel brakes, wherein a clamping force that holds the vehicle in the stationary state is generated as the said braking system is actuated. A braking procedure is performed at a brake motor so as to perform a function check and the actual current flowing through the brake motor is ascertained. If the actual current fails to achieve the desired current value, the holding brake is not enabled.

SUMMARY

The method in accordance with the disclosure can be used to perform a function check on an electromechanical brake device that comprises at least one electric brake motor by way of which a braking or clamping force can be generated in the vehicle. The electromechanical brake device is used by way of example as a holding or parking brake in vehicles in order to hold the vehicle in a lasting stationary state by way of the generated clamping force. Where appropriate, the electromechanical brake device can also be used as a vehicle brake or to support a hydraulic vehicle brake so as to reduce the vehicle velocity.

The brake piston that is adjusted by the electric brake motor can be part of a wheel braking device on a vehicle wheel, said wheel braking device being part of a hydraulic vehicle brake. In this embodiment, the brake piston is influenced in the case of a regular braking procedure by the pressure of the hydraulic brake fluid and, when using the electromechanical brake device as a holding brake while the vehicle is parked, said brake piston is influenced by the electric brake motor so as to generate a lasting clamping force.

The electromechanical brake device comprises at least one electric brake motor for generating a braking or clamping force. In accordance with an advantageous embodiment, the electromechanical brake device comprises two electric brake motors, by way of example in the wheel braking devices on the left hand rear wheel and right hand rear wheel of the vehicle.

With the aid of the method in accordance with the disclosure, it is possible to perform a function check on the electromechanical brake device. In so doing, the motor current is measured at the brake motor and compared with a mathematically-ascertained motor current. If the deviation between the measured motor current and the calculated motor current is greater than a predetermined error tolerance, then a malfunction is present and an error signal is generated.

With the aid of the method in accordance with the disclosure, it is possible in a simpler and more reliable manner to perform the function check on the electromechanical brake device. Errors in the electromechanical brake device lead to an inadmissibly high deviation between the measured motor current and the calculated motor current that can be ascertained and upon which the error signal is generated. The malfunction can relate to a component of the electromechanical brake device, by way of example a control device for controlling the brake motor or a measuring circuit for ascertaining the current and/or voltage at a control unit or at the brake motor.

The motor current is calculated in accordance with an advantageous embodiment from the difference between the measured motor voltage and the measured control unit voltage of a control unit for controlling the brake motor. This difference divided by the electrical resistance of the control unit represents the calculated motor current that is compared with the measured motor current at the brake motor. Accordingly, the motor current is ascertained from a relationship between the control unit voltage and the motor voltage.

The voltage is preferably measured as a control unit voltage at the control unit input.

In accordance with a further expedient embodiment that relates to an electromechanical brake device having two electric brake motors, the motor current for each brake motor is measured and compared with a respectively allocated, calculated motor current. An error signal is generated in the event that the difference between the measured motor current and the calculated motor current of a brake motor exceeds an allocated error tolerance. The error signal can even be generated if a corresponding deviation is present only in one brake motor. With the aid of the error signal, it is also possible to localize as a malfunction source the brake motor or a component that is allocated to the brake motor.

The error signal that is generated in the event that there is an inadmissibly high deviation between the measured motor current and the calculated motor current can be further processed in different ways. On the one hand, it is possible to store the error signal and/or to display said error signal to the driver in order to draw the attention of the driver to a corresponding malfunction in the electromechanical brake device.

On the other hand, the error signal can also be used in addition or alternatively to perform an alternative braking force build-up strategy in the electromechanical brake device. By way of example, it is thus possible so as to build up a maximal braking force in the event of a malfunction to control the electrical brake motor until a motor standstill is achieved the brake motor. In this case, the mechanical resistance whilst adjusting the brake piston by way of the electric brake motor increases to such a great extent that the motor torque of the electric brake motor is unable to further adjust the brake piston. It is ensured in this manner that by way of example in the case of a malfunction in one sensor it is still possible to adjust a minimum clamping force.

In a further advantageous embodiment, which relates to an electromechanical brake device having at least two electric brake motors, reference is made in the event of a malfunction in only one brake motor to the error-free current and/or voltage measured values of the other brake motor or of the other brake motors. This method procedure is possible providing that the brake motors are identical or at least to a great extent identical insofar as that in at least one brake motor the calculated motor current and the measured motor current match to a sufficient extent that the current measured values and voltage measured values of this brake motor can also be used for controlling the other brake motor in which the malfunction has occurred.

Generally, it is possible in the case of a malfunction to use a braking force build-up strategy in which the malfunction that has occurred is of no significance or is only of minor importance. It is thus possible when controlling the electric brake motor in lieu of referring back to the measured motor current, for example, to refer back to the calculated motor current or to select a strategy that does not depend upon the motor current for controlling the brake motor.

Where appropriate, it is also possible to simplify a current measuring circuit that is embodied in a redundant manner for ascertaining the motor current and in lieu of a redundant second current measuring circuit to use the calculated motor current for the plausibility check.

BRIEF DESCRIPTION OF THE DRAWINGS

Further advantages and expedient embodiments are disclosed in the description of the figures and the drawings. In the drawings.

DETAILED DESCRIPTION

Figure 1:
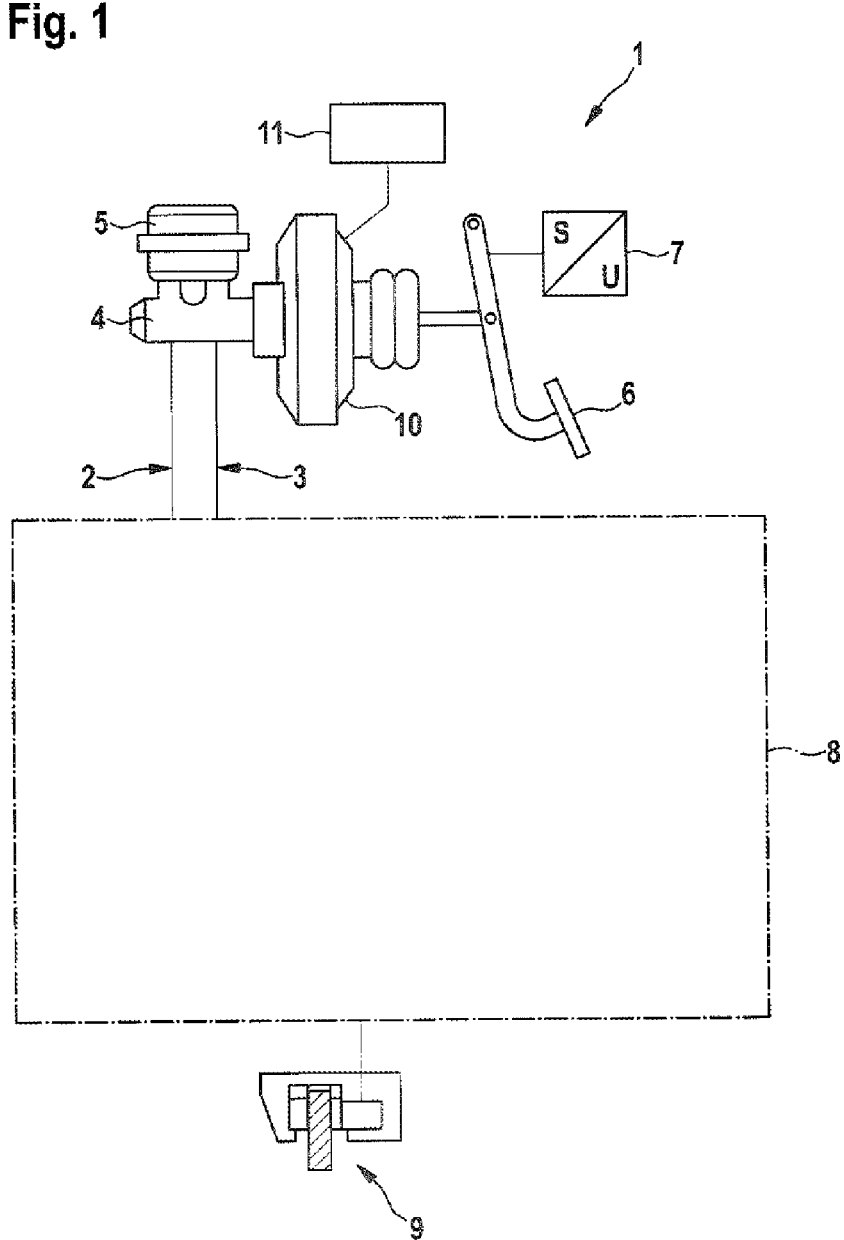
FIG. 1 illustrates a schematic view of a hydraulic vehicle brake having a brake booster, wherein the wheel braking devices of the vehicle brake are equipped at the vehicle rear axle in addition with an electromechanical brake device having an electric brake motor.

In the figures, like components are provided with like reference numerals.

The hydraulic brake 1 illustrated in FIG. 1 for a vehicle comprises a front axle brake circuit 2 and a rear axle brake circuit 3 for supplying and controlling wheel braking devices 9 at each wheel of the vehicle with a brake fluid that is subjected to hydraulic pressure. The two brake circuits 2, 3 are connected to a common master brake cylinder 4 that is supplied with brake fluid by way of a brake fluid storage device 5. The master brake cylinder piston within the master brake cylinder 4 is actuated by the driver by way of the brake pedal 6 and the pedal travel exerted by the driver is measured by way of a pedal travel sensor 7. A brake booster 10 is located between the brake pedal 6 and the master brake cylinder 4 and said brake booster comprises by way of example an electric motor that preferably actuates the master brake cylinder 4 (booster) by way of a gearing mechanism.

The adjusting movement of the brake pedal 6 that is measured by the pedal travel sensor 7 is transmitted as a sensor signal to a control unit 11 in which adjusting signals are generated so as to control the brake booster 10. The wheel braking devices 9 are supplied with brake fluid in each brake circuit 2, 3 by way of different switching valves that together with other components are part of the hydraulic brake system 8. Furthermore, a hydraulic pump that is a component of an electronic stability program (ESP) is part of the hydraulic brake system 8.

Figure 2:
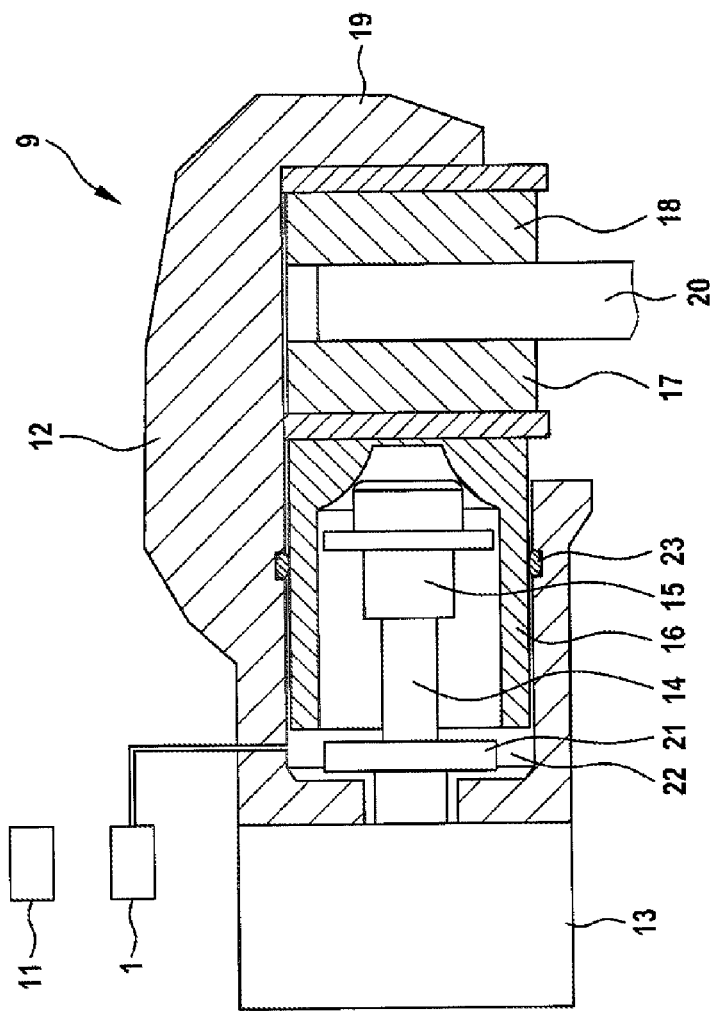
FIG. 2 illustrates a sectional view through an electromechanical brake device having an electric brake motor.

FIG. 2 illustrates in detail the wheel braking device 9 that is arranged on a wheel on the rear axle of the vehicle. The wheel braking device 9 is part of the hydraulic vehicle brake 1 and is supplied with brake fluid 22 from the rear axle brake circuit. The braking device 9 comprises in addition an electromechanical brake device that is preferably used as a holding brake for holding a vehicle in the stationary state, however, said braking device can also be used to brake the vehicle during a movement of the vehicle, in particular when the vehicle is travelling at lower velocities below a velocity threshold.

The electromechanical brake device comprises a brake caliper 12 having a caliper 19 that engages over a brake disc 20. As an adjusting member, the brake device comprises a direct current electric motor as a brake motor 13; the rotor shaft thereof drives a spindle 14 in a rotating manner and a spindle nut 15 is mounted in a non-rotatable manner on said spindle. As the spindle 14 rotates, the spindle nut 15 is axially adjusted. The spindle nut 15 moves within a brake piston 16 that is a carrier for a brake lining 17 that is urged by the brake piston 16 against the brake disc 20. A further brake lining 18 that is fixedly held on the caliper 19 is located on the opposite-lying side of the brake disc 20. The brake piston 16 is pressure-sealed on its outer face with respect to the receiving housing by an encompassing sealing ring 23.

During a rotating movement of the spindle 14, the spindle nut 15 can move within the brake piston 16 in an axially forwards direction towards the brake disc 20 or during a rotational movement of the spindle 14 in the opposite direction said spindle nut can move axially rewards until it arrives at a stop 21. In order to generate a clamping force, the spindle nut 15 impinges against the inner end face of the brake piston 16, as a result of which the brake piston 16 that is mounted in an axially displaceable manner in the brake device is urged with the brake lining 17 against the facing end face of the brake disc 20.

In order to generate the hydraulic braking force, the hydraulic pressure of the brake fluid 22 from the hydraulic vehicle brake 1 acts on the brake piston 16. The hydraulic pressure can also be effective in a supporting manner if the electromechanical brake device is actuated when the vehicle is stationary so that the entire braking force is composed from the electro-motorized portion and the hydraulic portion. Whilst the vehicle is travelling, either only the hydraulic vehicle brake is active or both the hydraulic vehicle brake and also the electromechanical brake device or only the electromechanical brake device are active so as to generate the braking force. The adjusting signals for controlling both the adjustable components of the hydraulic vehicle brake 1 and also the electromechanical wheel braking device 9 are generated in the control unit 11.

Figure 3:
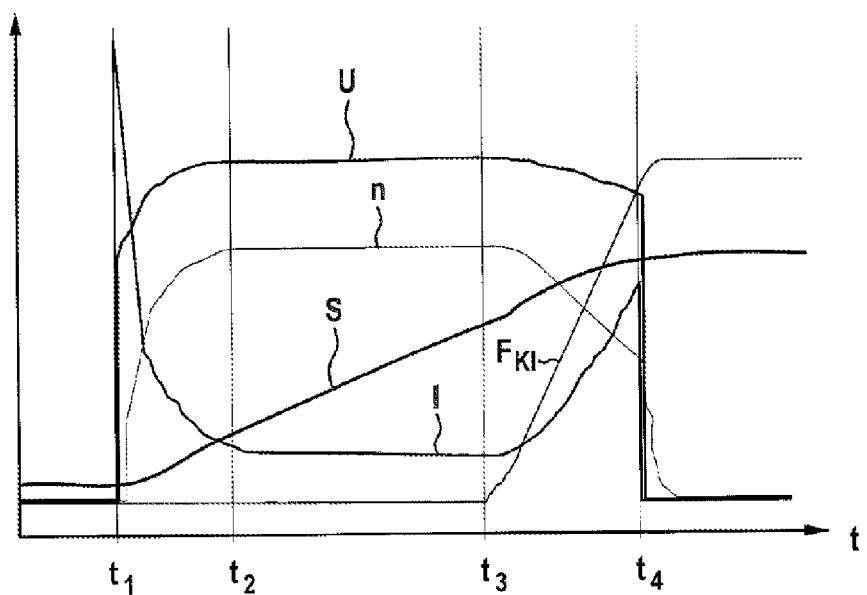
FIG. 3 illustrates a chart showing the time-dependent progression of the current, the voltage and the motor rotational speed as the holding brake is applied.

FIG. 3 illustrates a chart showing the time-dependent progression of the motor current I, the voltage U and the rotational speed progression n of the electrical brake motor for a brake application procedure. Furthermore, FIG. 3 illustrates the electromechanical clamping force $F_{K1}$ that is generated by the electric brake motor and FIG. 3 also illustrates the distance S travelled by the adjusting member that is influenced by the brake motor or by a brake motor.

At the point in time t1, the brake application procedure commences in that an electrical voltage is applied and the brake motor is energized in the case of the closed current circuit. The start phase (Phase I) takes place from the point in time t1 up to the point in time t2. At the point in time t2, the voltage U and the motor rotational speed n have achieved their maximum. The phase between t2 and t3 represents the idle phase (Phase II) in which the current I moves towards a minimum level. The force build-up phase (Phase III) follows the point in time t3 up to the point in time t4 in which the brake linings lie against the brake disc and are urged with increasing clamping force $F_{K1}$ against the brake disc. The electric brake motor is switched off at the point in time t4 by means of opening the current circuit so that during the further progression the rotational speed n of the brake motor drops to zero.

The point at which the force increases coincides with the phase of the force build-up at the point in time t3. The force build-up or the progression of the clamping force $F_{K1}$ can be ascertained by way of example with reference to the progression of the current I of the brake motor that fundamentally has the identical progression to that of the electromechanical clamping force. Starting from the low level during the idle phase between t2 and t3, the current progression increases at the beginning of the point in time t3. This increase in the current can be detected and used to determine the point at which the force increases. Fundamentally, however, the progression of the force build-up can also be determined from the voltage progression or rotational speed progression or from any random combination of the signals: current, voltage and rotational speed.

Figure 4:
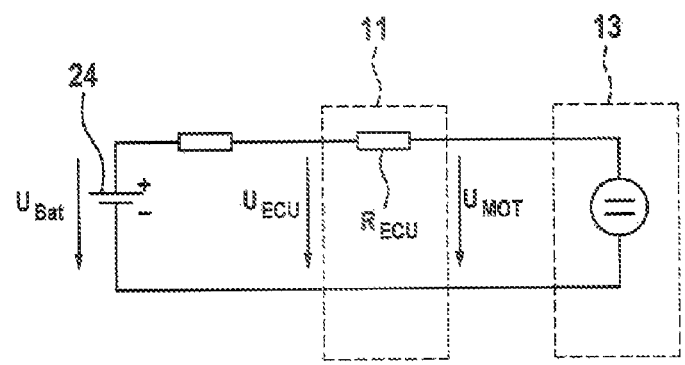
FIG. 4 illustrates a simplified view of an equivalent circuit diagram of an electromechanical brake device having a brake motor and indicated voltage measuring points.

FIG. 4 illustrates an equivalent circuit diagram of an electromechanical brake device having an electric brake motor 13 that is controlled by way of a control unit 11. FIG. 4 also illustrates the voltage measuring points $U_{Bat}$ at a voltage source 24 for the brake motor 13, the control unit input voltage $U_{ECU}$ at the input of the control unit 11 and also the motor voltage $U_{MOT}$ at the brake motor 13. It is possible by taking into consideration the electrical control unit resistance $R_{ECU}$ to ascertain from the equation:

$$I_{mot,c} = \frac{U_{ECU,m} - U_{mot,m}}{R_{ECU}}$$

the motor current $I_{mot,c}$ from the difference between the measured control unit input voltage $U_{ECU,m}$ and the motor voltage $U_{mot,m}$, divided by the control unit resistance $R_{ECU}$.

The calculated motor current $I_{mot,c}$ can be compared with a measured motor current $I_{mot,m}$ at the brake motor 13. If the deviation between the measured motor current and the calculated motor current exceeds a predetermined, admissible error tolerance, this leads to the generation of an error signal that can be stored, displayed to the driver and/or can be used for an alternative braking force build-up strategy.

Figure 5:
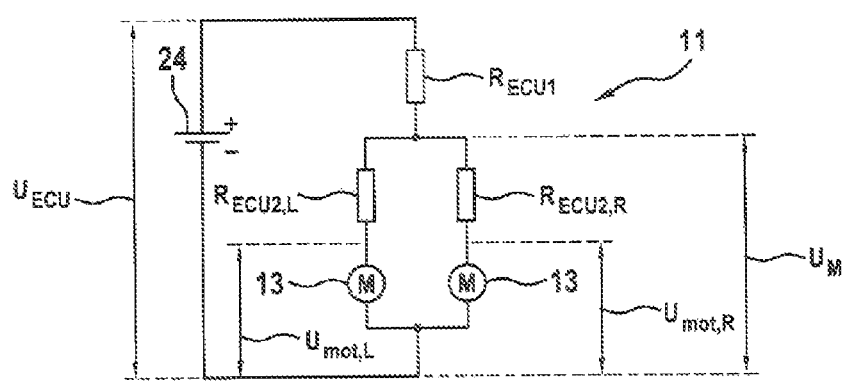
FIG. 5 illustrates a simplified view of an equivalent circuit diagram of a control unit for controlling an electromechanical brake device having two electric brake motors.

FIG. 5 illustrates a further equivalent circuit diagram for an electromechanical brake device having two electric brake motors 13 and a control unit 11. The inner resistance of the control unit 11 is calculated for the left hand branch from the total of $R_{ECU1}$ and $R_{ECU2,L}$ for the right hand branch from the total of the $R_{ECU1}$ and $R_{ECU2,R}$, wherein in each case an electric brake motor 13 is arranged in each branch. The motor current can be separated for the left hand branch and the right hand branch in accordance with:

$$I_{mot,L,c} = \frac{U_{ECU,m} - U_{M,m}}{R_{ECU1}} - \frac{U_{M,m} - U_{mot,R,m}}{R_{ECU2,R}}$$

$$I_{mot,R,c} = \frac{U_{ECU,m} - U_{M,m}}{R_{ECU1}} - \frac{U_{M,m} - U_{mot,L,m}}{R_{ECU2,L}}$$

wherein $U_{EU,m}$ represents the measured control unit input voltage, $U_{M,m}$ represents the measured voltage across the two brake motors, $U_{mot,L,m}$ represents the measured motor voltage of the left hand brake motor and $U_{mot,R,m}$ represents the measured motor voltage of the right hand brake motor.

Consequently, the calculated motor current $I_{mot,L,c}$ is available for the left hand branch having the first brake motor 13 and the calculated current $I_{mot,R,c}$ for the right hand branch having the second brake motor 13. These calculated motor currents can be compared in each case with an allocated measured motor current at the respective brake motor, wherein an error signal is generated in the event of an inadmissibly high deviation between the measured motor current and the calculated motor current.

Figure 6:
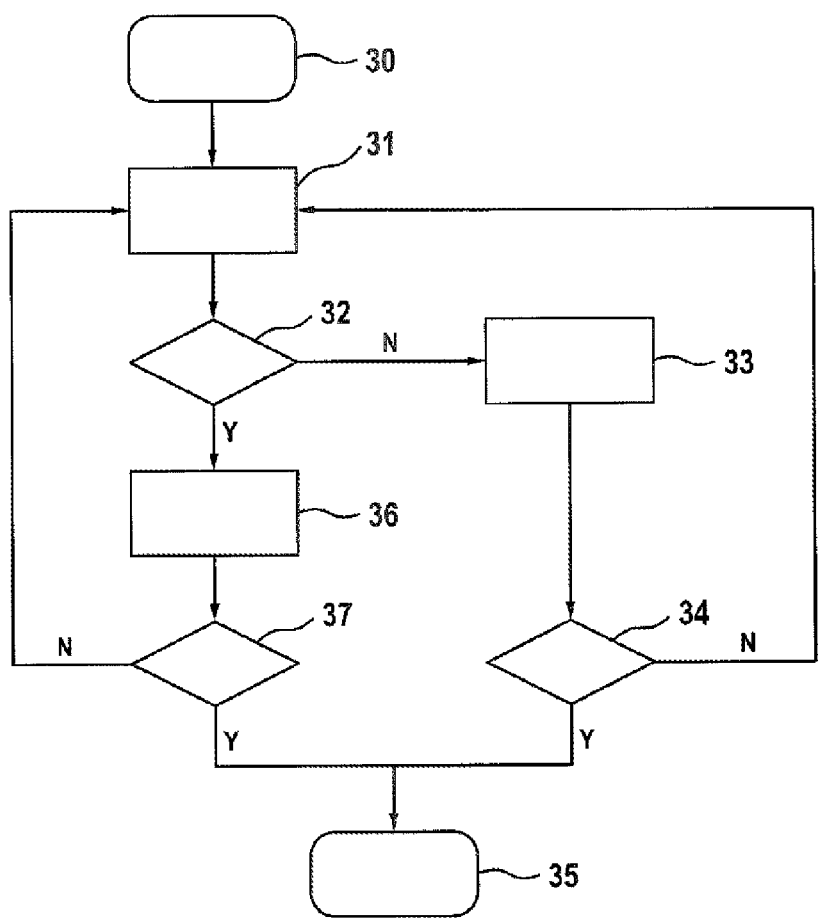
FIG. 6 illustrates a flow chart showing the method steps for performing a function check on the electromechanical brake device and for actuating the electromechanical brake device.

FIG. 6 illustrates a flow chart for performing a function check and implementing an alternative braking force build-up strategy. In the first step 30 at the beginning of the method, a request is made to close the parking or holding brake, by way of example by means of a manual actuation by the driver. In the following step 31, the electric brake motor is controlled in the closing direction or the direction in which said brake is applied. At the same time, the motor current is calculated in the electric brake motor as described by way of example in FIG. 4.

The query is performed in the following step 32 as to whether the amount of the difference between the calculated motor current and the measured motor current exceeds a permissible error tolerance. Insofar as this is not the case and consequently the calculated motor current and the measured motor current are sufficiently close to one another, the NO-branch ("N") moves to the next method step 33 in which the prevailing braking or clamping force is ascertained, by way of example on the basis of the motor current.

If the query in the next step 34 indicates that the prevailing clamping force has achieved the target clamping force, the YES-branch ("Y") moves as a result to the step 35, the method is terminated in this case as the required target clamping force is achieved. Otherwise, the method consequently moves back from the step 34 of the NO-branch to the step 31 and the brake application procedure continues.

If the query in step 32 indicates that the amount of the difference between the calculated motor current and the measured motor current exceeds an admissible error measurement, the YES-branch consequently moves forward to the step 36 at which point an alternative braking force build-up strategy is switched in. This is performed by way of example by means of building up a maximal possible braking force with the aid of the electrical brake motor that is controlled until such time that the brake motor comes to a standstill as a result of the increasing mechanical resistance.

In the following step 37, a query is performed as to whether an error signal is generated with the aid of the alternative braking force build-up strategy. If this is the case, the YES-branch consequently moves forwards to the final step 35; the method is now terminated. Otherwise, the NON-branch consequently moves back to the step 31 and the electrical brake motor is controlled so as to further build up the clamping force.

What is claimed is:

1. A method for operating an electromechanical brake device having at least one electric brake motor configured to generate a braking force in a vehicle, the method comprising:
   measuring a motor current of the at least one electric brake motor;
   comparing the measured motor current with a calculated motor current;
   generating an error signal in response to a deviation between the measured motor current the calculated motor current exceeding an error tolerance; and
   in response to the generation of the error signal, controlling the at least one electric brake motor until the motor comes to a standstill so as to build-up a maximal braking force of the electrometical brake device in order to hold the vehicle in a lasting stationary state.

2. The method according to claim 1 further comprising:
   ascertaining the calculated motor current from a difference between a measured motor voltage and a measured control unit voltage of a control unit, the control unit being configured to control the at least one electric brake motor.

3. The method according to claim 2 further comprising:
   measuring the control unit voltage at a control unit input.

4. The method according to claim 1, wherein the at least one electric brake motor of the electromechanical brake device comprises two electric brake motors, the method further comprising:
   measuring a respective motor current for both of the two brake motors;
   comparing each respective measured motor current with a respective allocated calculated motor current; and
   generating the error signal in response to a deviation between the respective measured motor current and the respective allocated calculated motor current for at least one of the two brake motors exceeding the error tolerance.

5. The method according to claim 1, wherein the steps of measuring, comparing, and generating are performed during a brake application procedure of the at least one electric brake motor that generates a clamping force.

6. The method according to claim 1 further comprising:
   in response to a malfunction, at least one of (i) switching to an alternative braking force build-up strategy and (ii) switching to one of alternative current values and alternative voltage values.

7. The method according to claim 6, wherein the at least one electric brake motor of the electromechanical brake device comprises two electric brake motors, the method further comprising:
   in response to the malfunction, referring to at least one of error-free current measured values and error-free voltage measured values of one of the two electric brake motors.

8. A control unit for performing a function check on an electromechanical brake device having at least one electric brake motor configured to generate a braking force in a vehicle, the control unit being configured to:
   measure a motor current of the at least one electric brake motor;
   compare the measured motor current with a calculated motor current;
   generate an error signal in response to a deviation between the measured motor current the calculated motor current exceeding an error tolerance; and
   in response to the generation of the error signal, controlling the at least one electric brake motor until the motor comes to a standstill so as to build-up a maximal braking force of the electrometrical brake device in order to hold the vehicle in a lasting stationary state.

9. A braking system in a vehicle, the braking system comprising:
   an electromechanical brake device having at least one electric brake motor configured to generate a braking force in the vehicle; and
   a control unit configured to control adjustable components of the braking system the control unit being further configured to:
   measure a motor current of the at least one electric brake motor;
   compare the measured motor current with a calculated motor current; and
   generate an error signal in response to a deviation between the measured motor current the calculated motor current exceeding an error tolerance.

10. The braking system according to claim 9, wherein the control unit is further configured to:
    ascertain the calculated motor current from a difference between a measured motor voltage and a measured control unit voltage at a control unit input of the control unit.

11. The braking system according to claim 9, wherein:
    the at least one electric brake motor of the electromechanical brake device comprises two electric brake motors, and
    the control unit is further configured to:
    measure a respective motor current for both of the two brake motors;
    compare each respective measured motor current with a respective allocated calculated motor current; and
    generate the error signal in response to a deviation between the respective measured motor current and the respective allocated calculated motor current for at least one of the two brake motors exceeding the error tolerance.

12. The braking system according to claim 9, wherein in response to a malfunction, the controller is further configured to:
    at least one of (i) switch to an alternative braking force build-up strategy, and (ii) switch to one of alternative current values and alternative voltage values.

13. The braking system according to claim 12, wherein in response to the malfunction, the controller is further configured to:
    control the at least one electric brake motor until the motor comes to a standstill so as to build-up a maximal braking force.

14. The braking system according to claim 12, wherein:
    the at least one electric brake motor of the electromechanical brake device comprises two electric brake motors, and
    the control unit is further configured, in response to the malfunction, to refer to at least one of error-free current measured values and error-free voltage measured values of one of the two electric brake motors.

* * * * *